(12) United States Patent
Toratani et al.

(10) Patent No.: US 6,725,734 B1
(45) Date of Patent: Apr. 27, 2004

(54) ROTATION SENSOR

(75) Inventors: Tomoaki Toratani, Tokyo (JP); Toshiro Yamamoto, Tokyo (JP); Hiroshi Morimoto, Tokyo (JP); Kyutaro Abe, Tokyo (JP); Masahiro Hasegawa, Tokyo (JP); Akira Noguchi, Tokyo (JP); Kosuke Yamawaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/316,442

(22) Filed: Dec. 11, 2002

(30) Foreign Application Priority Data

Jan. 23, 2002 (JP) .......................... 2002-014185

(51) Int. Cl.[7] .................................. G01L 3/00
(52) U.S. Cl. .................. 73/862.08; 73/862; 73/862.041
(58) Field of Search ................. 73/862, 862.08, 73/862.041

(56) References Cited

U.S. PATENT DOCUMENTS

| | | | |
|---|---|---|---|
| 4,831,419 A | * 5/1989 | Iaia et al. .................. 355/76 |
| 5,092,576 A | * 3/1992 | Takahashi et al. .......... 271/3.11 |
| 5,503,241 A | 4/1996 | Hiraiwa | |
| 5,588,843 A | 12/1996 | Sobhani | |
| 5,915,683 A | * 6/1999 | Otsuka .......................... 271/94 |
| 6,386,886 B1 | 5/2002 | Filaretos | |
| 6,441,626 B1 | 8/2002 | Mase | |
| 2002/0060506 A1 | 5/2002 | Kuhlmann-Wilsdorf | |
| 2002/0140313 A1 | 10/2002 | Noya et al. | |

* cited by examiner

Primary Examiner—Edward Lefkowitz
Assistant Examiner—Alandra Ellington
(74) Attorney, Agent, or Firm—Cohen, Pontani, Lieberman & Pavane

(57) ABSTRACT

A rotation sensor functioning as both a rotation-angle sensor and a torque sensor is provided which, when applied to a steering sensor for an automobile, for example, permits reduction in the number of components and thus in the weight of the automobile and contributes to conservation of global environment. The rotation sensor has slip rings covered with conductive synthetic resin having small coefficient of friction, allowing the contact pressure of brushes disposed in sliding contact with the slip rings to be kept low and the life duration of the slip rings to be prolonged. Further, no metal powder is produced when the brushes slide on the respective slip rings, and it is therefore possible to prevent the formation of unwanted insulating film.

5 Claims, 9 Drawing Sheets

ROTATION SENSOR

CROSS-REFERENCE TO RELATED APPLICATION

The present application claims priority based on Japanese Patent Application No. 2002-14185, which is incorporated herein by reference.

BACKGROUND OF THE INVENTION

1. Field of the Invention

The present invention relates to a rotation sensor, such as a steering sensor for an automobile, which is capable of measuring the angle of rotation of a shaft and torque acting thereon.

2. Description of the Related Art

With the recent movement toward the conservation of global environment, researches have been devoted to reducing the weight of a vehicle body, as a measure to reduce the exhaust gas from the automobile. One of such measures for lightening the vehicle body is to replace a hydraulic power steering assembly, which is one of the causes of increased weight of the vehicle body, with an electric power steering assembly. However, in the case of using an electric power steering assembly, an assisting force for a steering shaft needs to be computed using a computer. Accordingly, the electric power steering assembly requires two sensors, i.e. a rotation angle sensor (steering angle sensor) for measuring the rotational angle (steering angle) of the steering shaft and a torque sensor for measuring the torque applied to rotate the steering shaft. Thus, the number of components increases, making it difficult to reduce the weight of the vehicle body as intended.

Such a rotation angle sensor or torque sensor conventionally includes a type having mechanism where a brush is disposed in sliding contact with a conductive ring arranged concentrically with the shaft, for detecting the rotation angle or torque of the shaft. The mechanism, however, has a disadvantage that metal powder scatters due to friction when the brush and the slip ring, both made of metal, are in siding contact with each other. The metal powder undergoes a mechanochemical reaction with organic gas in the air, causing the formation of an insulating film and consequent unexpected increase of electric resistance.

It is possible to avert such increase of electric resistance by increasing the contact pressure of the brush and thereby scraping away the insulating film. However, this shortens the life duration of the slip ring.

SUMMARY OF THE INVENTION

It is an object of the present invention to provide a rotation sensor which functions as both a rotation angle sensor and a torque sensor and is capable of overcoming the aforementioned shortcomings.

It is another object of the present invention to provide a rotation sensor which ensures a long life duration of a slip ring.

According to the present invention, to accomplish the aforementioned objects there is provided a rotation sensor comprising an active rotor, a follower rotor arranged adjacent to the active rotor, the follower rotor sharing a rotation axis with the active rotor and capable of rotation following the active rotor, and a casing containing the active and follower rotors and allowing the rotors to rotate freely, wherein a disk-like slip-ring retainer plate is secured to an outer periphery of the active rotor for rotation together therewith, feeder slip rings, rotation-angle measuring slip rings, and torque measuring slip rings are all disposed on the slip-ring retainer plate and concentrically with the active rotor, the rotation-angle measuring slip rings and the torque measuring slip rings are covered with conductive resin, the torque measuring slip rings are arranged on one side of the slip-ring retainer plate facing the follower rotor, the feeder slip rings and the rotation-angle measuring slip rings are arranged on the other side of the slip-ring retainer plate opposite to the torque measuring slip rings, feeder brushes and rotation-angle measuring brushes are fixed to the casing for sliding contact with the feeder slip rings and the rotation-angle measuring slip rings, respectively, a torque measuring brush retainer plate is connected to an outer periphery of the follower rotor for rotation together therewith, torque measuring brushes are fixed to the torque measuring brush retainer plate for sliding contact with the respective torque measuring slip rings, the feeder bushes are electrically connected to each other and are connected to a power supply device, the rotation-angle measuring brushes are electrically connected to the feeder brushes and a rotation-angle computing device, and the torque measuring brushes are electrically connected to the feeder brushes and a torque computing device.

Other objects, features and advantages of the present invention will be apparent from the following detailed description.

DETAILED DESCRIPTION OF THE PREFERRED EMBODIMENTS

Embodiments of the present invention will be described hereinafter in detail with reference to the accompanying drawings.

Figure 1:
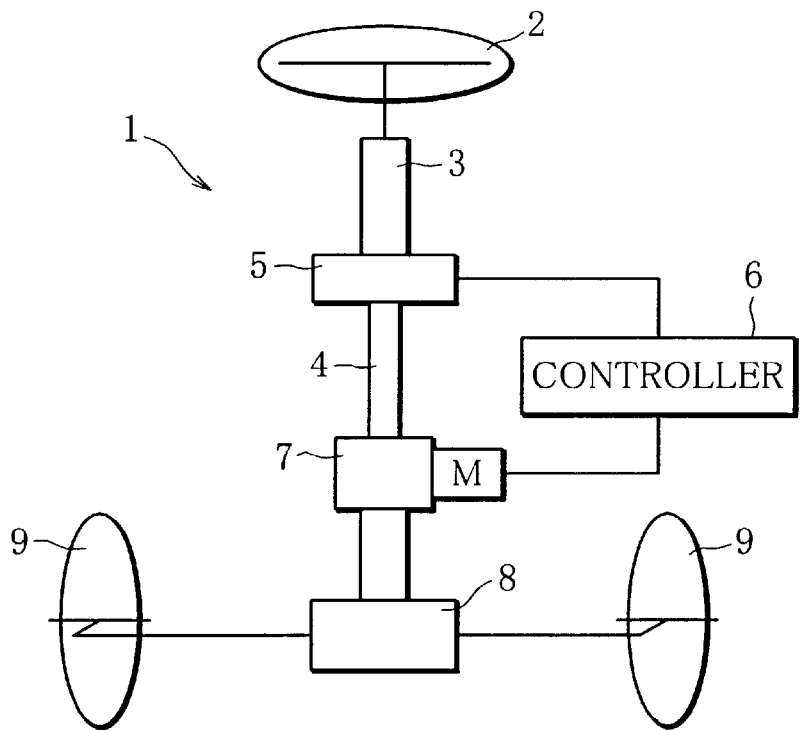
FIG. 1 is a block diagram illustrating a steering assembly for an automobile employing a rotation sensor in accordance with one embodiment of the present invention.

FIG. 1 is a block diagram illustrating a power steering system 1 for an automobile to which is applied a rotation sensor according to an embodiment of the present invention. In the power steering system 1, as a steering wheel 2 is turned, a steering shaft 3 turns together with the steering wheel. The steering shaft 3 has a torsion bar, not shown, arranged therein and extending coaxially therewith, and the torsion bar further extends through a column shaft 4 coaxially therewith. Thus, when the steering shaft 3 is rotated, this rotation is transmitted via torsion of the torsion bar to the column shaft 4 so that the column shaft also rotates.

A rotation sensor 5 is disposed at a joint between the steering shaft 3 and the column shaft 4, so as to cover the adjoining ends of the respective shafts. This rotation sensor 5 detects not only the angle of rotation of the steering shaft 3 (i.e. steering angle of the steering wheel) but also torque applied to rotate the steering shaft. The steering angle and torque detected by the rotation sensor 5 are transmitted to a controller 6.

The column shaft 4 is connected to a steering gear 7, to which an assisting force is provided by a servo motor M. Based on the detected steering angle and torque, the controller 6 instructs servo motor M to output a required assisting force.

The rotation of the steering gear 7 is transmitted via a rack-and-pinion assembly 8 to tires 9, the direction of the tires changes.

Figure 2:
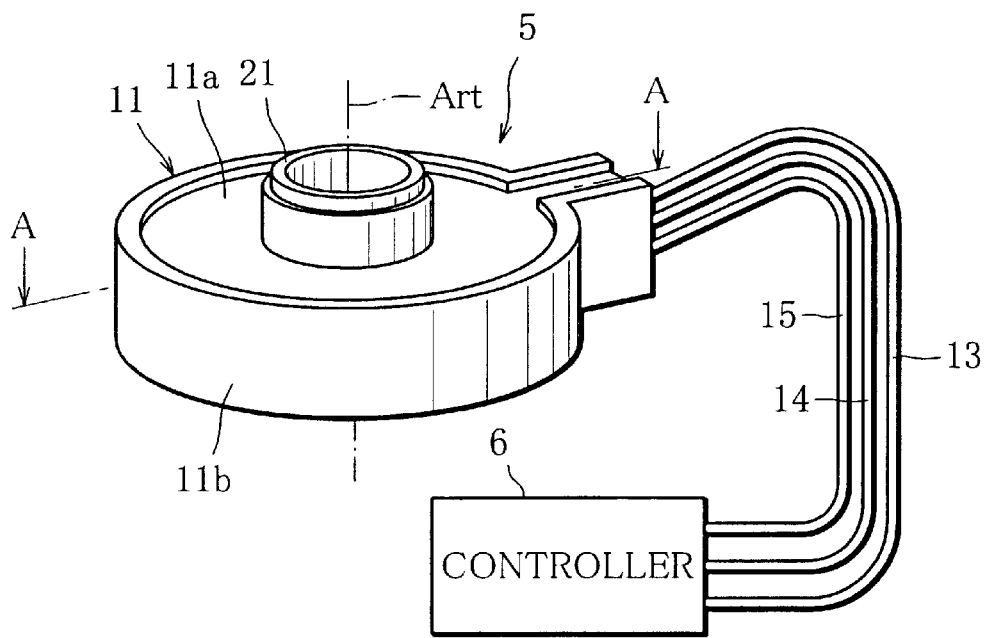
FIG. 2 is a perspective view of the rotation sensor shown in FIG. 1.

FIG. 2 is a perspective view of the rotation sensor 5 in accordance with the embodiment shown in FIG. 1. The rotation sensor 5 has an active rotor 21 and a follower rotor (not shown) having a common rotation axis $A_{rt}$ and contained in a casing 11 which includes a vessel 11a and a lid 11b. The rotation sensor 5 is supplied with electric power through a feeding cable 13 from a feeder unit (not shown) inside a controller 6. Additionally, the rotation sensor 5 sends detected voltages indicative of steering angle and torque to be measured, respectively, through a steering-angle measuring cable 14 and a torque measuring cable 15 to a steering-angle measuring computing unit and a torque computing unit arranged inside the controller 6, respectively.

Figure 3:
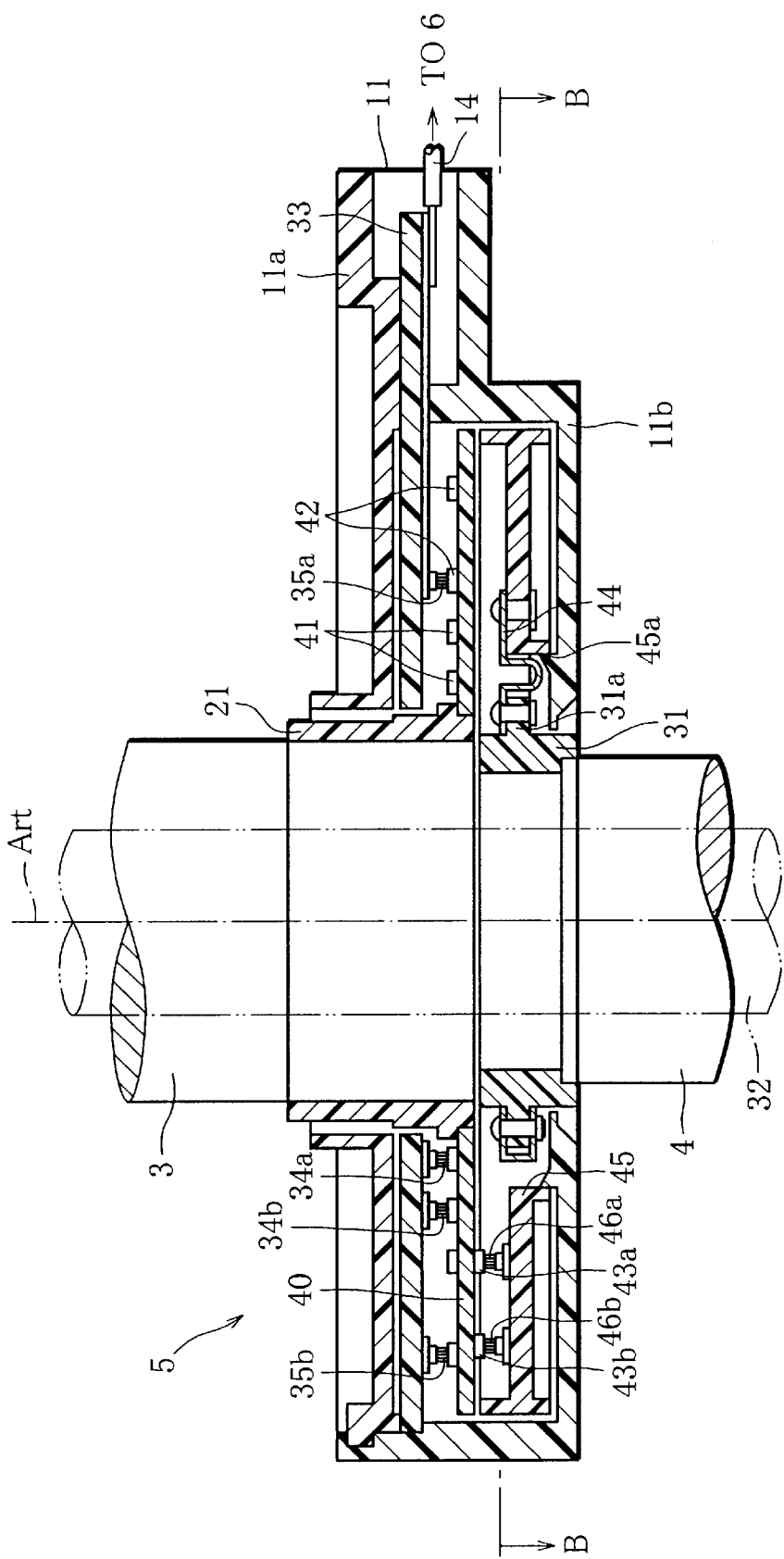
FIG. 3 is a cross sectional view taken along the line A—A in FIG. 2.

FIG. 3 is a cross sectional view of the rotation sensor 5 taken along the line A—A in FIG. 2. The active rotor 21, which is located at an upper part of the rotation sensor 5, vis secured to the steering shaft 3. On the other hand, the follower rotor 31, which is located at a lower part of the rotation sensor 5, is secured to the column shaft 4. The steering shaft 3 and the column shaft 4 share the rotation axis $A_{rt}$. A torsion bar 32 extends through the steering shaft 3 and column shaft 4 coaxially therewith and is connected to both of the shafts.

An upper brush retainer plate 33 is secured to the inner surface of the lid 11a of the casing 11, in a manner interposed between the lid 11a and the vessel 11b. This upper brush retainer plate 33 retains feeding brushes 34a, 34b and steering-angle measuring brushes 35a, 35b. The feeding brushes 34a, 34b are electrically connected to the feeding cable 13 shown in FIG. 2. On the other hand, the steering-angle measuring brushes 35a, 35b are electrically connected to the steering-angle measuring cable 14 shown in FIG. 2. Only the steering-angle measuring cable 14 connected to the steering-angle measuring brush 35a is shown in FIG. 3.

Under these brushes, a slip-ring retainer plate 40 is positioned and secured to the periphery of the end of the active rotor 21. The slip-ring retainer plate 40 rotates together with the active rotor 21. The slip-ring retainer plate 40 has feeder slip rings 41 and steering-angle measuring slip rings 42 arranged on an upper surface thereof concentrically with the rotation axis $A_{rt}$. These feeder slip rings 41 and steering-angle measuring slip rings 42 are disposed in sliding contact with the corresponding feeding brushes 34a, 34b and steering-angle measuring brushes 35a, 35b.

The rotation sensor 5 is fed with electric power through the feeding brushes 34a, 34b which are in sliding contact with the feeder slip rings 41. Also, the feeder slip rings 41 are electrically connected to the steering-angle measuring slip rings 42.

Further, the slip-ring retainer plate 40 has two torque measuring slip rings 43a, 43b (each with the shape of an arc) disposed on a lower surface thereof concentrically with the rotation axis $A_{rt}$. These torque measuring slip rings 43a, 43b are electrically connected to the feeder slip rings 43a, 43b, respectively.

A lower brush retainer plate 45 is located under the torque measuring slip rings 43a, 43b. The lower brush retainer plate 45 is connected via an elastic coupler 44 to a flange 31a of the follower rotor 31 and retains torque measuring brushes 46a, 46b in position such that the brushes 46a, 46b come into sliding contact with the respective torque measuring slip rings 43a, 43b. The torque measuring brushes 46a, 46b are connected to the torque measuring cable 15.

When the steering wheel is turned, the steering shaft 3 rotates inside the casing 11 of the rotation sensor 5. Thereupon, the torsion bar 32 twists elastically, so that the column shaft 4 rotates following the twisting of the torsion bar. Thus, when the steering shaft 3 rotates, the active rotor 21 fixedly connected thereto rotates, and also the follower rotor 31 secured to the column shaft 4 rotates.

When the steering shaft 3 rotates, the radial position of the feeder slip rings 41 does not move since the feeder slip rings 41 are retained concentrically with the slip-ring retainer plate 40 rotating together with the active rotor 21. Therefore, the feeding brushes 34a, 34b, which are secured to the casing 11 via the slip-ring retainer plate 33, remain in sliding contact with the feeder slip rings 41, so that the supply of electric power is never interrupted.

The steering-angle measuring slip rings 42 are fed with electric power from the feeder slip rings 41 electrically connected thereto. Like the feeding brushes 34a, 34b, the steering-angle measuring brushes 35a, 35b are kept in sliding contact with the respective steering-angle measuring slip rings 42. As the steering-angle measuring slip rings 42 rotate and thus their position relative to the steering-angle measuring brushes 35a, 35b changes in the circumferential direction, the voltage ratio along the steering-angle measuring slip rings 42 changes. Accordingly, the controller 6 can computes a steering angle of the steering wheel, based on this voltage ratio.

When the follower rotor 31 rotates, the torque measuring brushes 46a, 46b retained on the lower brush retainer plate 45 rotate together with the follower rotor 31 via the coupler 45. While the torque reaction transmitted via the tires from the road surface is small, there is no difference of rotation angle occurs between the steering shaft 3 (and the active rotor 21) and the column shaft 4 (and the follower rotor 31). Thus, the contact position of the torque measuring slip rings 43a, 43b rotating together with the active rotor 21 relative to the torque measuring brushes 46a, 46b rotating together with the follower rotor 31 remains unchanged.

However, as the torque reaction increases, the torsion bar 32 begins to twist, causing a difference of rotation angle between the column shaft 4 (and the follower rotor 31) and the steering shaft 3 (and the active rotor 21). Consequently, the contact position of the torque measuring brushes 46a, 46b relative to the torque measuring slip rings 43a, 43b shifts in the circumferential direction. In this case, since the electric resistance changes by an amount corresponding to the distance over which the torque measuring brushes 46a, 46b move along the torque measuring slip rings 43a, 43, the voltage changes correspondingly. Therefore, the controller 6 can compute a torque based on this voltage change.

Accordingly the rotation sensor 5 serves not only as a rotation sensor but as a torque sensor. Thus, where the rotation sensor is incorporated in an automobile, for example, it is possible to reduce the number of components, thereby reducing the weight of the vehicle body.

Figure 4:
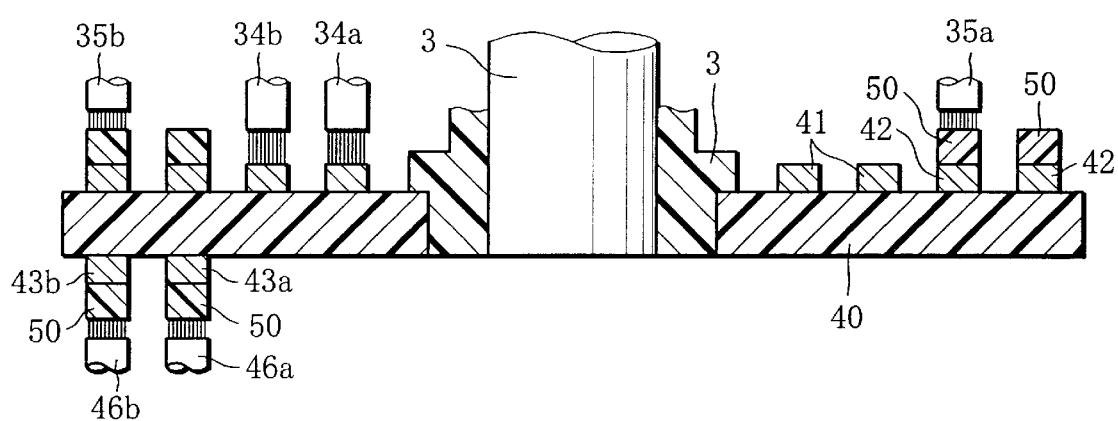
FIG. 4 is a view of a slip-ring retainer plate shown in FIG. 3.

FIG. 4 is an enlarged view of the slip-ring retainer plate 45 shown in FIG. 3. As is apparent from the figure, the steering-angle measuring slip rings 42 and torque measuring slip rings 43a, 43b are each covered with a resin film 50 with low frictional resistance. This synthetic resin film 50 is made of epoxy resin containing carbon and thus has electric conductivity.

According to this embodiment, the steering-angle measuring brushes 35a, 35b and torque measuring brushes 46a, 46b do not directly contact the metal slip rings, and thus no metal powder is produced due to the friction. Thus, no insulating film is formed through the mechanochemical reaction of metal powder. Furthermore, the contact pressure of each brush can be made small by virtue of the low-frictional synthetic resin film 50.

Accordingly, the steering-angle measuring brushes 35a, 35b and torque measuring brushes 46a, 46b do not directly contact the corresponding metal slip rings 41, 42, 43a, 43b, and further, since the contact pressure is small, the life duration of each slip ring can be prolonged.

The feeder slip rings 41 are not covered with synthetic resin film in order to minimize the potential drop.

To cut down the production cost, no synthetic resin film may be formed on those portions of the slip rings which are significantly remote from the initial position (i.e. neutral position of the steering wheel) and thus which scarcely come into sliding contact with the respective brushes.

Figure 5:
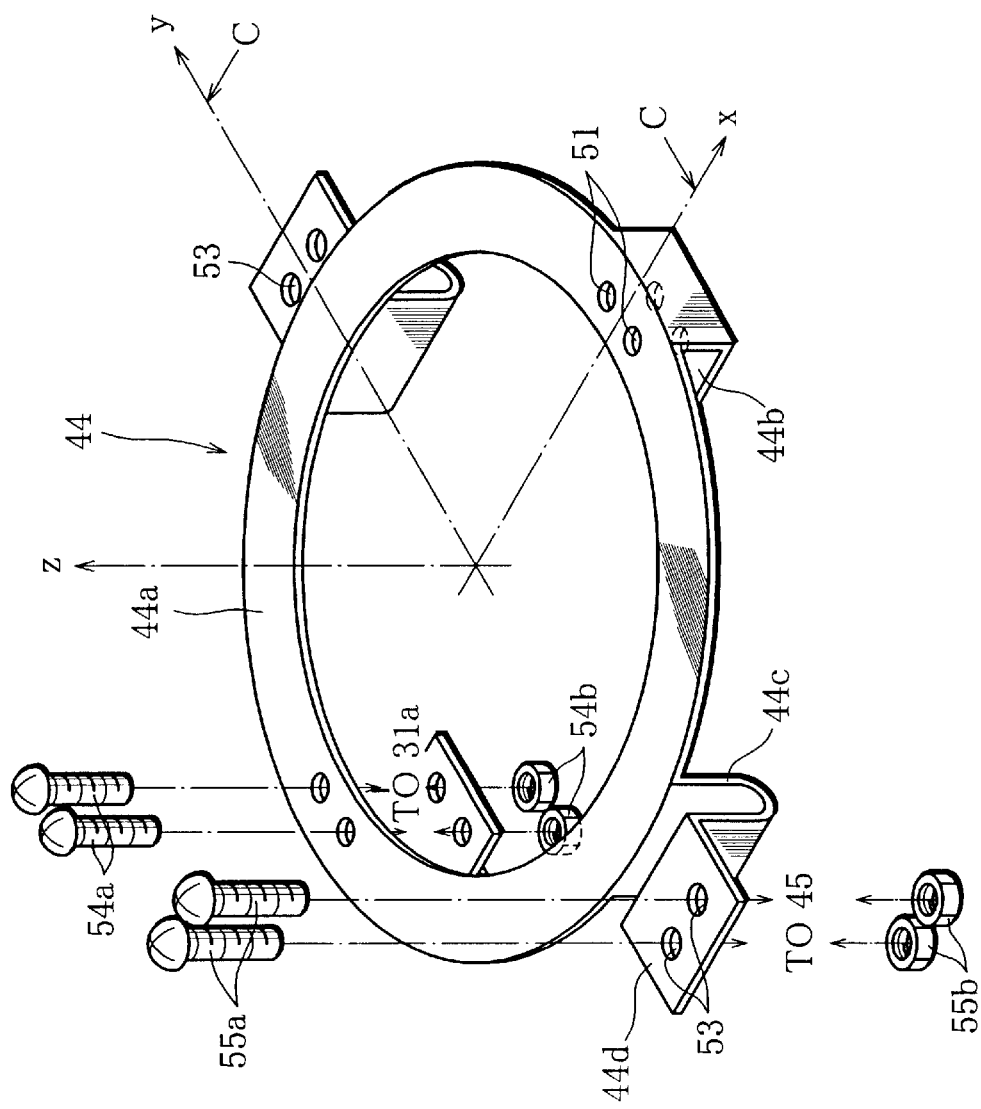
FIG. 5 is an exploded perspective view of a coupler shown in FIG. 3.

FIG. 5 is a perspective view of the elastic metal coupler 44 shown in FIG. 3. Two pairs of bolt holes 51 are formed on opposite sides of a circular base 44a as viewed in the direction of x-axis. Inner mounting protrusions 44b protrude from the base 44a and are situated under the bolt holes 51, respectively. Two bolt holes 52 are formed in each of the inner mounting protrusions 44b in alignment with the respective bolt holes 51 in the direction of z-axis. Outer mounting protrusions 44c are formed on opposite sides of the circular base 44a as viewed in the direction of y-axis via curved portions 44b. Two bolt holes 53 are formed in each of the outer mounting protrusions 44c.

The coupler 44 is secured to the flange 31a of the follower rotor 31 by means of nuts 54b and bolts 54a inserted through the bolt holes 51, 52. Also, the coupler 44 is secured to the lower brush retainer plate 45 by means of nuts 55b and bolts 55a inserted through the bolt holes 53.

The cross sectional view of FIG. 3 illustrates the coupler 44 as viewed from the direction of C in FIG. 5 so that the mounting of the coupler 44 may be understood more easily.

Figure 6:
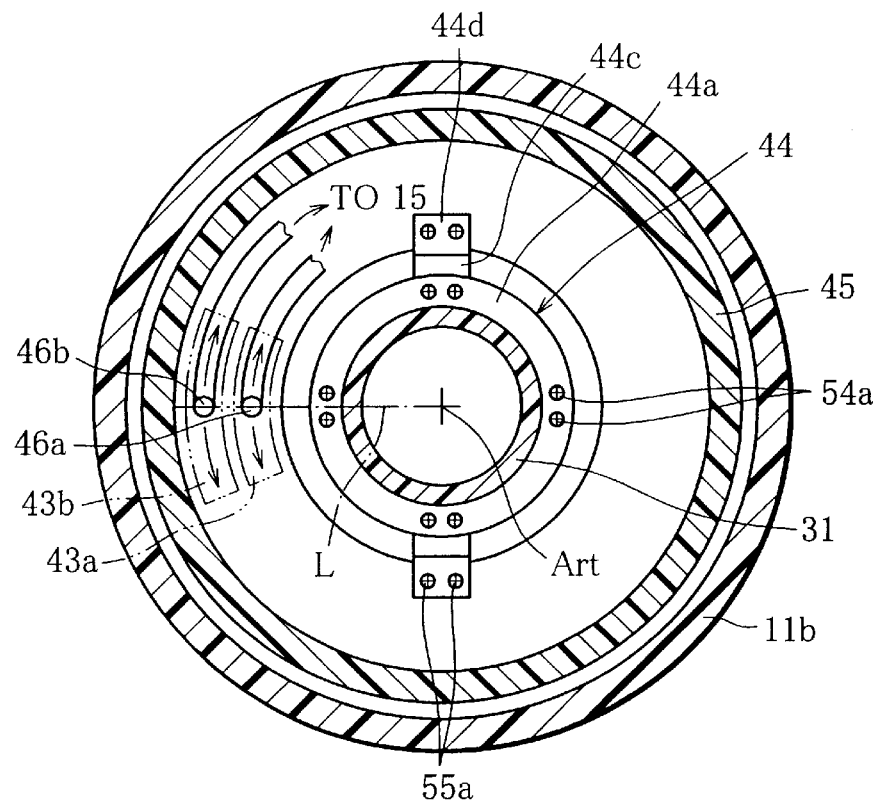
FIG. 6 is a cross sectional view taken along the line B—B in FIG. 3.

FIG. 6 is a cross sectional view taken along the line B—B in FIG. 3. The circular base 44a of the coupler 44 is fitted in the follower rotor 31 and is coupled to the flange 31a (not shown in FIG. 6) by means of bolts 54a, as mentioned above. The coupler 44 is further coupled, by means of bolts 55a, to the lower brush retainer plate 45 contained in the vessel 11b. The two torque measuring brushes 46a, 46b connected to the torque measuring cable 15 are disposed on the same side of the lower brush retainer plate 45 in alignment with a line L crossing the rotation axis $A_{rt}$. As the lower brush retainer plate 45 rotates, the torque measuring brushes 46a, 46b slide on the respective torque measuring slip rings 43a, 43b in the circumferential direction while keeping their alignment with the line L.

The function of the coupler 44 is as follows: During rotation of the follower rotor 31, the rotation axis thereof can occasionally become misaligned with the rotation axis $A_{rt}$ in the x-y plane. In such a case, the curved portions 44c absorb the misalignment in the direction of y-axis by their elastic deformation as seen from FIGS. 5 and 6. Moreover, since the curved portions 44c each have a small width in the direction of x-axis, the base 44a secured to the flange 31a of the follower rotor 31 is allowed to move elastically in the direction of x-axis by the distance of misalignment with respect to the outer mounting protrusions 44d secured to the lower brush retainer plate 45 by means of the bolts 55a.

Thus, the lower brush retainer plate 45 can keep the position thereof on the x-y plane irrespective of axial misalignment of the follower rotor, thereby preventing the torque measuring brushes 46a, 46b from being misaligned in the x-y plane and thus from becoming out of contact with the torque measuring slip rings 43a, 43b.

Even though the follower rotor 31 tilts, the coupler 44 can keep the lower brush retainer plate 45 in position since the coupler 44 has elasticity also in the direction of z-axis by virtue of the curved portions 44c.

The coupler 44 has sufficiently high rigidity in the circumferential direction, as is apparent from the shape thereof shown in FIG. 5. Thus, the lower brush retainer plate 45 is capable of rotating together with the follower rotor 31 via the coupler 44.

Figure 7:
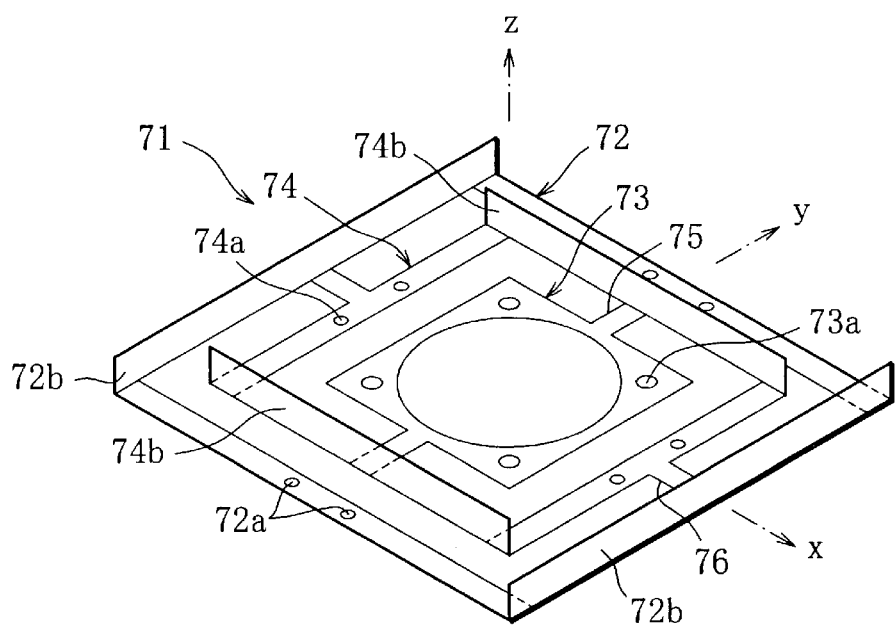
FIG. 7 is a perspective view of a coupler in accordance with another embodiment of the present invention.

FIG. 7 is a perspective view of a coupler 71 according to another embodiment, which can be formed more easily than the aforementioned coupler. The coupler 71 is formed by punching a square metal plate and has an outer part 72, an inner part 73 and an intermediate part 74. The intermediate part 74 has two pairs of bolt holes 74a on opposite sides thereof as viewed in the direction of x-axis. The outer part 72 has two pairs of bolt holes 72a on opposite sides thereof as viewed in the direction of y-axis. The inner part 73 has a bolt hole 73a formed in each of its four corners. The outer part 72 has folded portions 72b bent in the direction of z-axis at both sides thereof as viewed in the direction of x-axis. The intermediate part 74 also has folded portions 74b bent in the direction of z-axis at both sides thereof as viewed in the direction of y-axis. The inner part 73 and the intermediate part 74 are connected to each other by y-axis direction bridges 75, and the outer part 72 and the intermediate part 74 are connected to each other by x-axis direction bridges 76.

Figure 8:
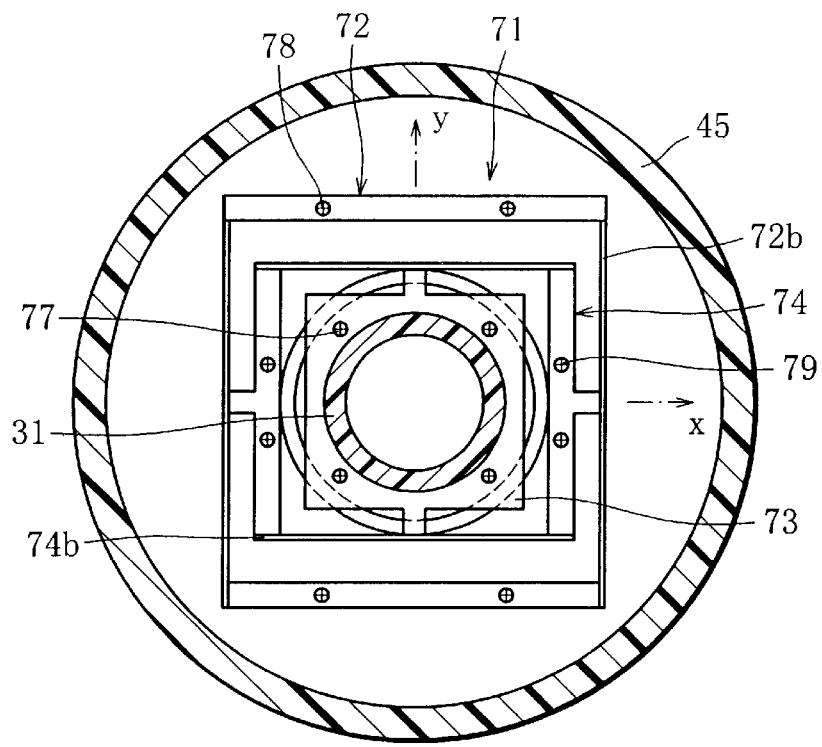
FIG. 8 is a plan view of the coupler of FIG. 7 coupled to a lower brush retainer plate shown in FIG. 3.

FIG. 8 is a plan view illustrating the coupler 71 of FIG. 7 attached to both the follower rotor 31 and the lower brush retainer plate 45. The inner part 73 of the coupler 71 is fitted in the follower rotor 31 and is secured to the flange 31a by means of bolts 77. The outer part 72 and the intermediate part 74 are secured to the lower brush retainer plate 45 by means of bolts 78 and 79, respectively.

When the axis of the follower rotor 31 becomes misaligned in the x-y plane, the misalignment in the direction of x-axis is absorbed by elastic deformation of the y-axis direction bridges 75 in the direction of x-axis. On the other hand, the misalignment in the direction of y-axis is absorbed with the thin x-axis direction bridge 76 elastically deforming in the direction of y-axis. Therefore, even when the misalignment of the follower rotor 31 occurs, the lower brush retainer plate 45 can remain in its proper position.

Figure 9:
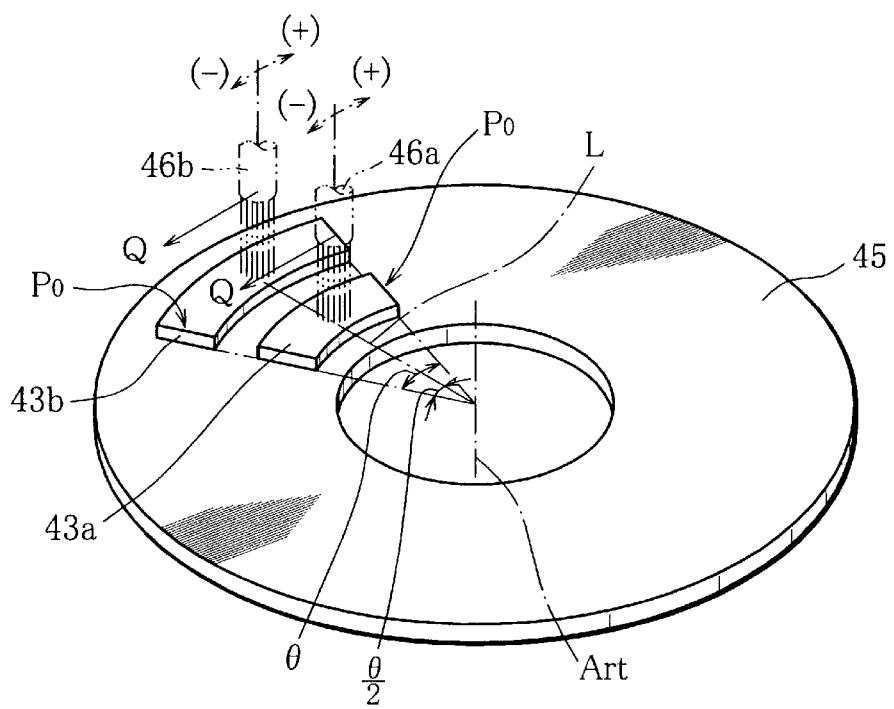
FIG. 9 is a perspective view of a lower surface of the slip-ring retainer plate shown in FIG. 3.

FIG. 9 is a perspective view of the slip-ring retainer plate 40, showing a lower surface thereof on which are provided the torque measuring slip rings 43a, 43b. As mentioned above, the torque measuring slip rings 43a, 43b each have the shape of an arc having a center angle θ about the rotation axis $A_{rr}$, since the difference of rotation angle between the active rotor and the follower rotor cannot become very great. The inner torque measuring slip ring 43a is connected to the feeder slip ring 41 so that its back end may be at a ground voltage $P_0$ (=0V). On the other hand, the outer torque measuring slip ring 43b is connected to the feeder slip ring 41 so that its front end may be at a ground voltage $P_0$.

As mentioned above, the torque measuring brushes 46a, 46b slide on the respective torque measuring slip rings 43a, 43b about the rotation axis $A_{rr}$, while being located on the line L passing the rotation axis $A_{rr}$. As shown in the figure, the initial position (neutral position) of the torque measuring brushes 46a, 46b is set at an intermediate point (i.e. the position of θ/2) of the torque measuring slip rings 43a, 43b. The sign indicative of the difference of rotation angle between the active and rotors is defined as follows: The sign is plus when the torque measuring brushes 46a, 46b relatively move clockwise; and the sign is minus when they relatively move counterclockwise.

Figure 10:
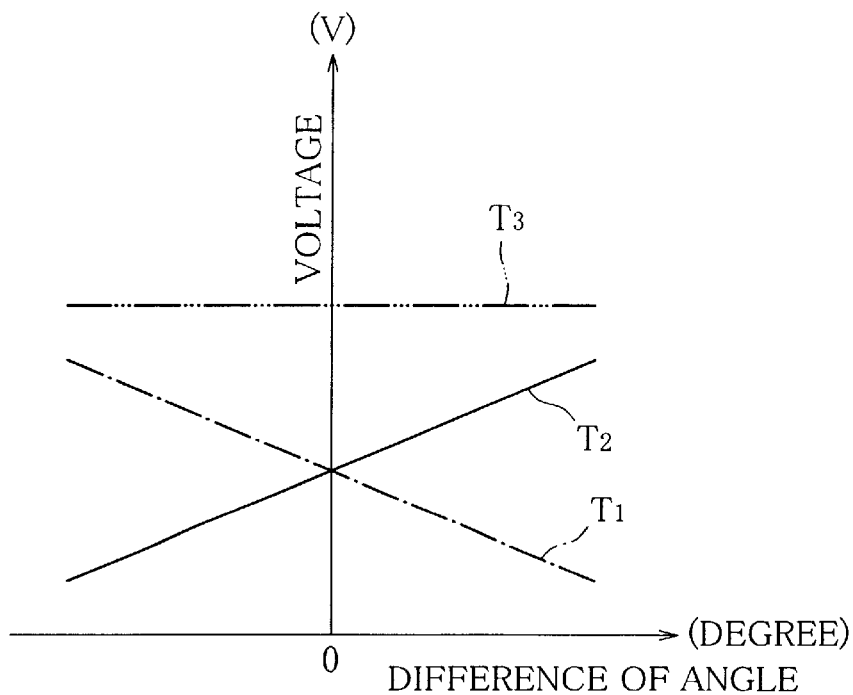
FIG. 10 is a graph depicting change of voltages relating to torque measurement.

FIG. 10 depicts voltages detected as the torque measuring brushes 46a, 46b slide on the respective slip rings. As the torque measuring brushes 46a, 46b slide in the positive (+) direction of the angle difference, the voltage detected by the torque measuring brush 46a shows a straight line $T_1$. Because the detected voltage decreases down to the ground voltage. On the other hand, the voltage detected by the torque measuring brush 46b shows a different straight line $T_2$, because the detected voltage increases more and more from the ground voltage. As far as no abnormality occurs, both of the torque measuring brushes 46a, 46b keep their positions aligned with the line L. Thus, the absolute value of the gradient of the voltage $T_1$ is equal to that of the voltage $T_2$.

To detect the occurrence of abnormal voltage, a voltage $T_3$ is used which is the sum of the voltages $T_1$ and $T_2$. As far as no abnormality occurs, the voltage $T_3$ takes a constant value. Based on the voltages $T_1$ and $T_2$ the controller 6 computes the sum voltage $T_3$ and detects the occurrence of abnormality.

Figure 11:
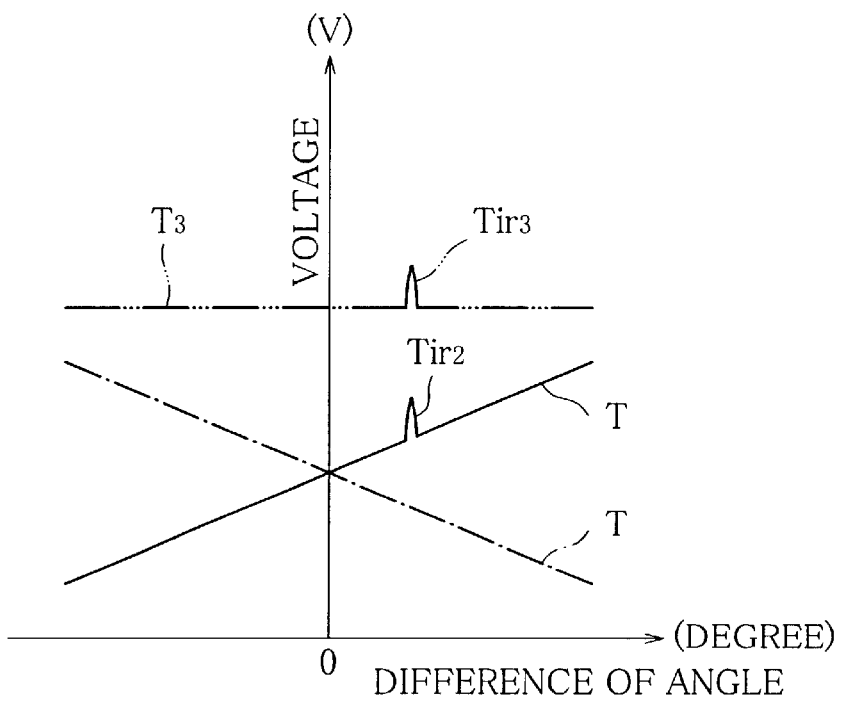
FIG. 11 is a graph depicting change of voltages relating to torque measurement in case of abnormality.

As shown in FIG. 11, if the voltage $T_2$ shows an abnormal value $T_{ir2}$ for some reason, then the voltage $T_3$ takes an abnormal value $T_{ir3}$, deviating from the constant value. In such a case, the controller recognizes the occurrence of abnormality and carries out a predetermined process. The controller, however, is set in such a manner that a deviance falling within a predetermined range may not to be regarded as an abnormality.

Figure 12:
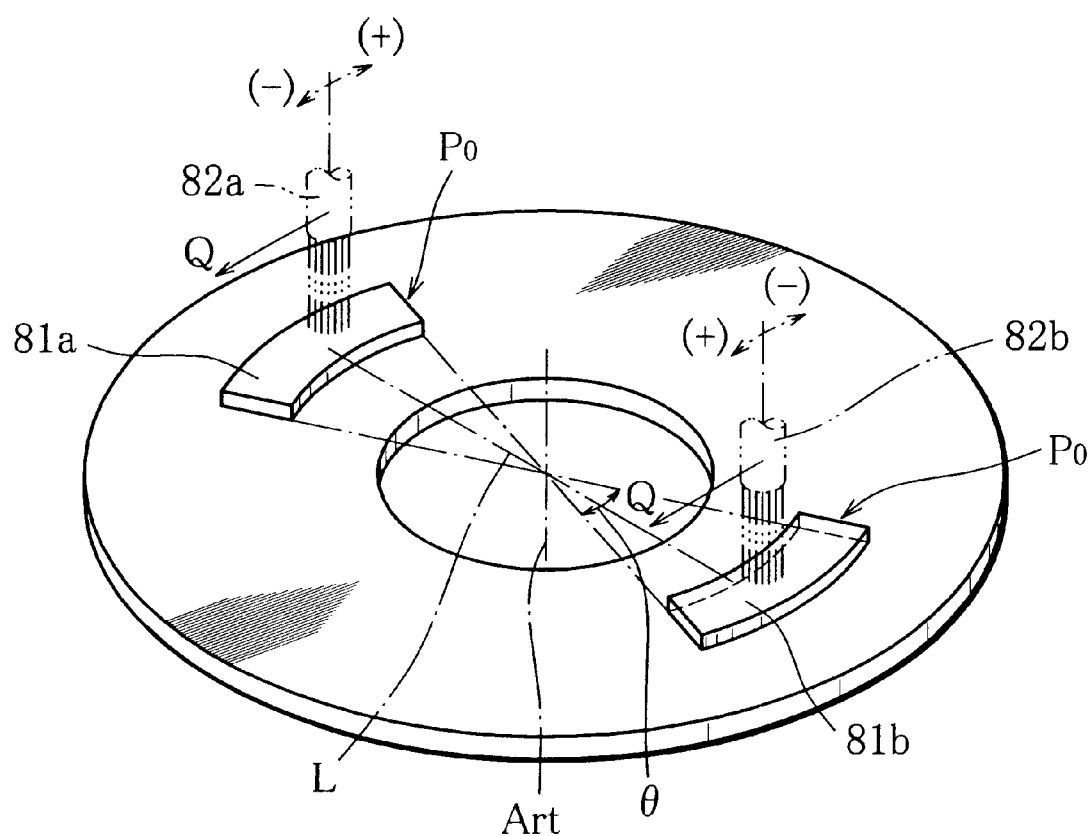
FIG. 12 is a perspective view of torque measuring slip rings laid out differently from those in accordance with the embodiment of the present invention.

FIG. 12 illustrates the layout of torque measuring slip rings different from that of the embodiment of the present invention. The torque measuring slip rings 81a, 81b are disposed on diametrically opposite side with respect to the rotation angle $A_{rt}$ and occupy regions corresponding to a center angle θ. Torque measuring brushes 82a, 82b are also positioned diametrically opposite to each other with respect to the rotation angle $A_{rt}$. However, this layout is similar to that shown in FIG. 10 in that the initial position of the torque measuring brushes 82a, 82b lies on the intermediate point of the torque measuring slip rings 81a, 81b and that the sign indicative of the difference of rotation angle is plus when the torque measuring brushes 82a, 82b move clockwise and is minus when the brushes 82a, 82b move counterclockwise. The back ends of the torque measuring slip rings 81a, 81b as viewed in FIG. 12 may be at a ground voltage.

Figure 13:
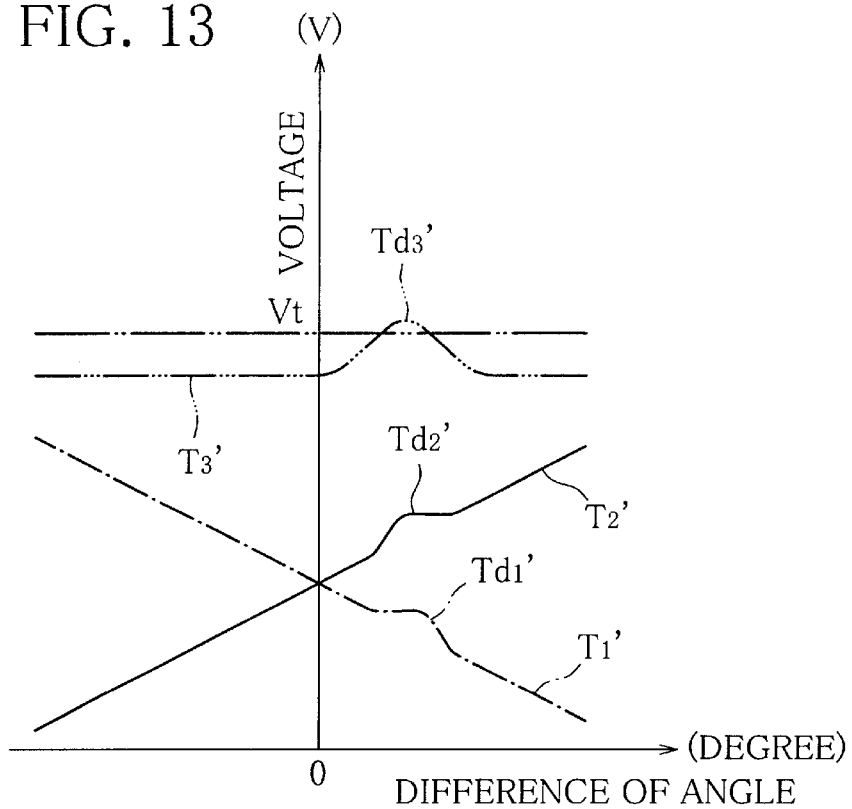
FIG. 13 is a graph depicting change of voltages relating to torque measurement observed in cases where vibration occurs in the torque measuring brushes disposed in sliding contact with the torque measuring slip rings shown in FIG. 12.

FIG. 13 depicts voltages detected by the torque measuring slip rings 81a, 81b and the torque measuring brushes 82a, 82b. While no abnormality is observed, voltages $T_1'$ and $T_2'$ detected by the torque measuring brushes 82a, 82b, respectively, indicate the same values as the voltage $T_1$ and $T_2$.

However, it is very often that the automobile undergoes a sudden vibration while the torque measuring brushes 82a, 82b slide in the circumferential direction, with the result that both of the torque measuring brushes 82a, 82b translate or move in the same direction on the x-y plane as indicated by arrows Q. In this case, the voltage $T_1'$ detected by the torque measuring brush 82a deviates in the direction away from the ground voltage $P_0$, showing an increased voltage $Td_1'$. On the other hand, the voltage $T_2'$ detected by the torque measuring brush 82b also deviates in the direction away from the ground voltage $P_0$, similarly showing an increased voltage $Td_1'$.

Consequently, the sum voltage $T_3'$ of the voltages $T_1'$ and $T_2'$ increases up to $Td_3'$ in a region where the voltages $Td_1'$ and $Td_2'$ are summed up. Accordingly, the voltage $T_3'$ exceeds a threshold voltage $V_t$ for discriminating the occurrence of abnormality. It is, however, undesirable that such vibration to be frequently observed and to fall within a normal range be regarded as abnormality.

Figure 14:
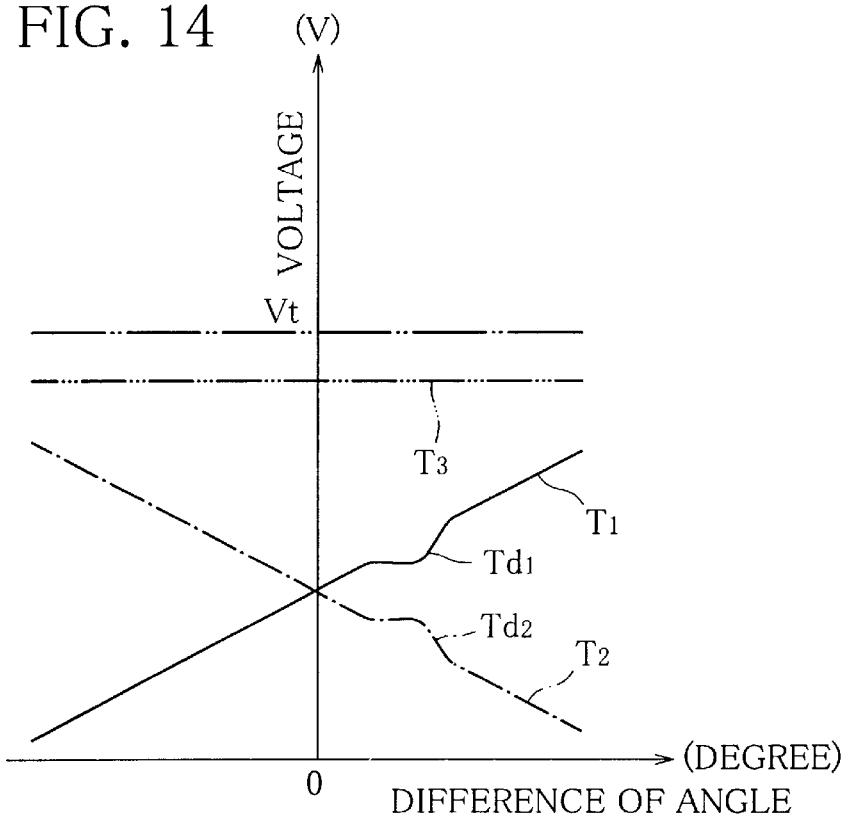
FIG. 14 is a graph depicting change of voltages relating to torque measurement observed in cases where the vibration occurs in the torque measuring brushes disposed in sliding contact with the torque measuring slip rings shown in FIG. 9.

According to the embodiment of the present invention shown in FIG. 9, the voltage $T_1$ detected by the torque measuring brush 46a deviates in the direction away from the ground voltage $P_0$, showing a voltage $Td_1$, as shown in FIG. 14, in case of the aforementioned translation or movement in the direction Q. On the other hand, the voltage $T_2$ detected by the torque measuring brush 46b deviates in the direction toward the ground voltage $P_0$, showing a voltage $Td_2$. Therefore, the voltages $Td_1$ and $Td_2$ offset each other, thereby keeping the sum voltage $Td_3$ constant and preventing a normal vibration from being regarded as abnormality.

It should be noted that the present invention is not limited to the embodiments described hereinabove. For example, the coupler 44 may be provided on the active rotor side.

It is also possible to apply the rotation sensor of the present invention to the links of a plurality of arms of a robot, etc.

It is to be noted that all suitable modifications and equivalents may be regarded as falling within the scope of the invention in the appended claims and their equivalents.

What is claimed is:

1. A rotation sensor comprising:
   an active rotor;
   a follower rotor arranged adjacent to the active rotor, the follower rotor sharing a rotation axis with the active rotor and capable of rotation following the active rotor; and
   a casing containing the active and follower rotors and allowing the rotors to rotate freely, wherein
      a disk-like slip-ring retainer plate is secured to an outer periphery of the active rotor for rotation together therewith, a pair of feeder slip rings, a pair of rotation-angle measuring slip rings, and a pair of torque measuring slip rings are all disposed on the slip-ring retainer plate and concentrically with the active rotor, the rotation-angle measuring slip rings and the torque measuring slip rings are covered with conductive resin, the torque measuring slip rings are arranged on one side of the slip-ring retainer plate facing the follower rotor, the feeder slip rings and the rotation-angle measuring slip rings are arranged on the other side of the slip-ring retainer plate opposite to the torque measuring slip rings, feeder brushes and rotation-angle measuring brushes are fixed to the casing for sliding contact with the feeder slip rings and the rotation-angle measuring slip rings, respectively, a disk-like torque measuring brush retainer plate is connected to an outer periphery of the follower rotor for rotation together therewith, torque measuring brushes are fixed to the torque measuring brush retainer plate for sliding contact with the respective torque measuring slip rings, the feeder bushes are electrically connected to each other and are connected to a power supply device, the rotation-angle measuring brushes are electrically connected to the feeder brushes and a rotation-angle computing device, and the torque measuring brushes are electrically connected to the feeder brushes and a torque computing device.

2. The rotation sensor of claim 1, wherein the coupler absorbs an axis misalignment of the follower rotor in a plane perpendicular to the rotation axis of the rotors, thereby keeping the torque measuring brushes in position.

3. The rotation sensor of claim 1, wherein the pair of torque measuring slip rings are shaped like an arc extending about the rotation axis of the follower rotor and are disposed on an identical side of the disk-like slip-ring retainer plate, and one of the torque measuring slip rings has a clockwise end serving as a reference position for torque detection voltage, and the other of the torque measuring slip rings has a counterclockwise end serving as a reference position for torque detection voltage.

4. The rotation sensor of claim 1, wherein the conductive resin comprises carbon-containing epoxy resin.

5. The rotation sensor of claim 1 or 4, wherein the disk-like torque measuring brush retainer plate is connected to the follower rotor via a coupler having rigidity in the circumferential direction.

* * * * *